US006344081B1

(12) United States Patent
Pelot et al.

(10) Patent No.: US 6,344,081 B1
(45) Date of Patent: Feb. 5, 2002

(54) CONCRETE COMPOSITION

(75) Inventors: James E. Pelot; H. Wayne Hutchens, both of Lewisville; Stephen Z. Baxter, Dallas, all of NC (US)

(73) Assignee: Glasflo Products, Inc., Lewisville, NC (US)

(*) Notice: Subject to any disclaimer, the term of this patent is extended or adjusted under 35 U.S.C. 154(b) by 0 days.

(21) Appl. No.: 09/557,504

(22) Filed: Apr. 25, 2000

Related U.S. Application Data

(60) Provisional application No. 60/164,524, filed on Nov. 10, 1999, provisional application No. 60/164,629, filed on Nov. 10, 1999, provisional application No. 60/178,457, filed on Jan. 27, 2000, and provisional application No. 60/190,454, filed on Mar. 17, 2000.

(51) Int. Cl.$^7$ .......................... C04B 14/02; C04B 14/22
(52) U.S. Cl. ....................... 106/711; 106/705; 106/709; 106/714; 106/716; 106/789; 106/814; 106/816; 106/697
(58) Field of Search ................................ 106/705, 709, 106/711, 714, 716, 789, 814, 816, 697

(56) References Cited

U.S. PATENT DOCUMENTS

| | | | | |
|---|---|---|---|---|
| 2,410,954 A | | 11/1946 | Sharp ........................... | 106/98 |
| 2,524,947 A | | 10/1950 | Wallace ........................ | 106/97 |
| 2,793,130 A | | 5/1957 | Shannon et al. ............... | 106/99 |
| 3,823,021 A | | 7/1974 | Jansen ........................... | 106/97 |
| 3,954,490 A | * | 5/1976 | Cockram ...................... | 106/90 |
| 4,002,482 A | | 1/1977 | Coenen .................... | 106/40 V |
| 4,090,884 A | | 5/1978 | Goeman ....................... | 106/99 |
| 4,440,576 A | | 4/1984 | Flannery et al. .............. | 106/85 |
| 4,454,285 A | | 6/1984 | Bijen ............................ | 524/5 |
| 4,534,796 A | | 8/1985 | Massol ......................... | 106/99 |
| RE32,742 E | | 9/1988 | Skjeldal ........................ | 106/98 |
| 5,690,729 A | | 11/1997 | Jones, Jr. ..................... | 106/682 |
| 5,755,876 A | | 5/1998 | Stokes et al. ................ | 106/739 |
| 5,788,407 A | | 8/1998 | Hwang ......................... | 404/81 |
| 5,803,960 A | | 9/1998 | Baxter ......................... | 106/711 |
| 5,810,921 A | | 9/1998 | Baxter et al. ................. | 106/711 |
| 5,916,361 A | | 6/1999 | Molloy et al. .............. | 106/696 |
| 6,022,408 A | | 2/2000 | Stokes et al. ................ | 106/739 |

OTHER PUBLICATIONS

"Reuse/Recycling of Glass Cullet for Non–container Uses," pp. 42–51, "Concrete Applications." Prepared for Dane County Department of Public Works, 1919 Exp Way, Madison, WI 53713; Ed. John Reindl (Obtainable from Ed. at reindl@co.dane.wi.us; Ph. No. (608)267–8815 (Feb. 20, 2000).

"Glass Aggregate in Concrete Demonstration Project: Final Report," Prepared for Dane County Department of Public Works by Prof. Steven M. Cramer and R.A. Wells, Department of Civil and Environmental Engineering, Univ. of Wisconsin–Madison, No date available.

Meyer, C.M. and S. Baxter, "Use of Recycled Glass for Concrete Masonry Blocks," Final Report prepared for The New York State Energy Research and Development Authority (NYSERDA), Report 97–15; Technical Communication Unit, NYSERDA, Corp. Plaza West, 286 Washington Ave. Extension, Albany, NY 12203–6399, http://www.nyserda.org (Nov. 1997).

Meyer, C.M. and S. Baxter, "Use of Recycled Glass and Fly Ash for Precast Concrete," Final Report prepared for The New York State Energy Research and Development Authority (NYSERDA), Report 98–18; Technical Communication Unit, NYSERDA, Corp. Plaza West, 286 Washington Ave. Extension, Albany, NY 12203–6399, http://www.nyserda.org (Oct. 1998).

* cited by examiner

Primary Examiner—Elizabeth D. Wood
(74) Attorney, Agent, or Firm—Carl B. Massey, Jr.; Womble Carlyle Sandridge & Rice, PLLC

(57) ABSTRACT

The invention relates to concrete compositions with improved characteristics which contain glass, including ordinary recycled glass. The invention also relates to methods of producing the concrete compositions of the invention. In particular, the invention relates to a cement composition containing glass particles, including recycled glass, a substance to mitigate alkali-silica reaction such as lithium-containing glass, and cement. The compositions provided exhibiting improved characteristics and are particularly useful for applications such as forming surfaces adjacent to swimming pools. The present invention also relates to compositions containing E-glass (also known as electric glass). Such compositions are particularly useful as pool plasters for finishing surfaces associated with swimming pool construction. The present invention also relates to processes for producing E-glass-containing compositions.

55 Claims, No Drawings

CONCRETE COMPOSITION

This application claims benefit under 35 U.S.C. § 119(e) of U.S. Provisional Application No. 60/164,524, filed Nov. 10, 1999; application Ser. No. 60/164,629, filed Nov. 10, 1999; application Ser. No. 60/178,457, filed Jan. 27, 2000; and application. Ser. No. 60/190,454, filed Mar. 17, 2000, the contents of all of which are fully incorporated by reference herein.

FIELD OF THE INVENTION

The present invention relates to the production of concrete compositions having improved characteristics and containing glass, including ordinary recycled glass. In particular, the invention relates to concrete compositions that are especially well-suited to applications such as forming outdoor recreational surfaces, for example those adjacent to, or inside of, swimming pools. The present invention also relates to compositions containing E-glass (also known as electric glass) and processes for producing E-glass-containing compositions.

BACKGROUND

Due to recent interest in recycling and improved collection for recycling of glass, a significant surplus of recycled glass has accumulated. A substantial amount of such glass is simply land-filled, there being no significant economic motive for its further use. Significant amounts of glass byproducts are also generated from certain manufacturing processes which are not readily disposed of, or productively utilized.

A number of attempts have been made to successfully use glass as an additive in concrete compositions. Certain compositions proposed have been successful in accomplishing specific goals. For example, U.S. Pat. Nos. 5,803,960 and 5,810,921 to Baxter, describe the addition of lithium-containing and chromium-containing glass, respectively, in order to overcome alkali-silica reaction (ASR) in concrete compositions. The glass compositions disclosed, however, are specifically directed to the suppression of ASR, and must be specially formulated. Glass compositions containing zirconia have also been suggested as alkali-resistant glass components of cement compositions (glass fibers—U.S. Pat. No. 5,912,361, to Molloy et al.). Other forms of specially treated glass fibers for concrete reinforcement have also been suggested, as have certain specialized compositions containing very fine silica particles or silica dust, e.g. as disclosed in U.S. Pat. No. 4,385,935, to Skjeldal (reissue Re. 32,742).

Desired characteristics of a general use concrete composition include adequate strength, a reasonable open time (time from pouring to irreversible set), decreased slump, decreased splash, decreased creep, a thixotropic character during open time allowing re-working of the initial set using vibration of the mixture, decreased bleed, and increased density and water impermeability.

Certain applications may require concrete compositions possessing further special characteristics. One example is the application of concrete compositions to form the areas adjacent to, or inside of, swimming pools or other outdoor recreational areas. It is desirable to produce a composition which may be effectively "washed" after pouring, such that an increased amount of surface area is actually comprised of exposed aggregate component surfaces. This reduces the temperature experienced when such surfaces are contacted, e.g by bare feet of persons utilizing the area around a swimming pool. Accordingly, it would be desirable to formulate a cement or concrete composition which exhibits superior characteristics particularly applicable to such uses. Such characteristics include superior workability, as discussed above, and characteristics compatible with the particular processes for preparing surfaces of such outdoor recreational areas.

Accordingly, it would be very desirable to produce a concrete composition possessing these desired characteristics by utilizing a glass component capable of having the ordinary composition of recycled glass, or utilizing a glass component derived from an industrial byproduct.

E-glass, also referred to as electric glass, is a type of borosilicate glass. E-glass is typically produced as a fiber component, e.g. for use in reinforced plastics utilized in applications requiring a high degree of electrical resistivity. The production method generally utilized results in a substantial amount of waste which is unusable in the standard application. Therefore, the use of E-glass in an improved concrete composition also would also provide a productive use for waste E-glass, as well as imparting superior characteristics to such compositions. Accordingly, it would also be desirable to produce a concrete composition having improved characteristics which includes in its composition a component comprising E-glass. In addition, it would also be desirable to provide a process wherein an E-glass component may be added to a general processing operation to producing a cement or concrete composition suitable for transport or immediate use.

SUMMARY OF THE INVENTION

The present invention provides cement and concrete compositions having improved characteristics which contain glass, including recycled glass as well as compositions containing E-glass. The invention also relates to methods for producing the concrete compositions of the invention. The concrete compositions of the invention are particularly useful because they exhibit adequate strength, a reasonable open time (time from pouring to irreversible set), decreased slump, decreased splash, decreased creep, a thixotropic character during open time allowing re-working of the initial set using vibration of the mixture, decreased bleed, and increased density and water impermeability.

The present invention also provides a use for, and means of disposal of, both recycled glass and waste E-glass. The recycled glass used in particular compositions of the invention is not of any specialized glass composition, nor is it specially treated. Further, the invention provides a process for producing E-glass containing cement or concrete compositions wherein the E-glass component is added prior to a general processing operation in the production of the cement or concrete compositions. Such a process increases the efficiency of the production of composition of the invention in a form suitable for transport, storage or immediate use.

In one aspect, the present invention relates to a concrete composition comprising glass particles, cement, and aggregate, wherein the size of the glass particles comprises a graded particle size distribution from about 100 mesh to about 325 mesh.

In another aspect, the invention relates to concrete composition comprising glass particles, cement, blast furnace slag and aggregate.

In another aspect, the invention relates to a concrete composition comprising glass particles, cement, fly ash, and aggregate.

In another aspect, the invention relates to methods of producing the concrete compositions of the invention.

In another aspect, the present invention relates to a cement and concrete compositions comprising glass particles, cement, a substance to mitigate alkali-silica reaction (ASR), and aggregate, wherein the size of the glass particles comprises a graded particle size distribution from about 100 mesh to about 325 mesh.

In another aspect, the present invention relates a composition comprising E-glass particles, cement, and aggregate, wherein the size of the E-glass particles comprises a maximum particle size of from about 275 to about 375 mesh.

In another aspect, the invention relates to methods of producing the cement and concrete compositions of the invention.

In order to produce a cement or concrete composition having desirable characteristics for forming surfaces for outdoor recreational areas, such as areas adjacent to, or inside of, swimming pools, the glass particles of the invention may be combined with cement, aggregate and a substance known in the art to reduce the phenomenon of alkali-silica reaction or ASR. Addition of such a substance is generally necessary in these applications due to the use of reactive aggregate in the final compositions. Significant advantageous properties are achieved by combining cement and aggregate with the glass particles as described and an effective amount of lithium-containing glass (see U.S. Pat. No. 5,803,960 to Baxter), or other substances known in the art to mitigate ASR.

The concrete compositions of the present invention flow only on demand, exhibit superior workability, and can be vibrated to activate the thixotropic character of the composition without segregation of the materials. The compositions of the invention are especially useful on steep slopes due to the reduced tendency to exhibit creep. The compositions also place less stress on forms and the forms may be stripped sooner. The compositions can also be pumped with lower slump than standard concrete and may be pumped under water with less segregation than standard compositions. The low slump compositions of the present invention also finish easier and smoother that standard concrete having similar slump characteristics. The compositions of the invention also exhibit less bleed water and the mix water remains in the composition, allowing it to be finished faster. Vibrating or manual manipulation causes the compositions to remain open for working longer (increased thixotropic character), however, once manipulation is stopped, the compositions becomes very stable allowing forms to be removed sooner.

The E-glass-containing compositions of the invention are particularly useful as pool plasters in the construction of swimming pools. These compositions have superior workability as described above. The E-glass also acts as a pozzolan and does not contribute to ASR. It increases flow, controls creep, and increases workability while controlling bleed water and shrinkage. The E-glass-containing compositions of the invention are also particularly useful as grouts or mortars.

The present invention, and preferred embodiments thereof, are described in more detail below. Although the present invention has been described with reference to certain embodiments, other embodiments may achieve similar results and advantages. Variations and modifications of the present invention will be apparent to one skilled in the art and the disclosure herein is intended to cover all such modifications and equivalents.

DETAILED DESCRIPTION OF THE INVENTION

In one aspect, the present invention relates to a concrete composition comprising glass particles, cement, and aggregate, wherein the size of the glass particles comprises a graded particle size distribution from about 100 mesh to about 325 mesh.

In a preferred embodiment, the size of the glass particles is characterized by a maximum size of from about 80 to about 120 mesh, and from about 40% to about 60% of the glass particles are from about 180 to about 220 mesh, and from about 10% to about 30% of said glass particles are less than 325 mesh. More preferably, the maximum size of the glass particles is about 90 to about 110 mesh. Also more preferably, substantially none of said glass particles are larger than 100 mesh. Also more preferably, about 70% to about 90% of the glass particles are larger than about 325 mesh. Most preferably, about 12% of the glass particles is about 100 mesh, about 47% of the glass particles is about 200 mesh, about 19% of the glass particles is about 325 mesh, and about 22% of the glass particles is below about 325 mesh.

In another preferred embodiment, the glass particles are particles of recycled glass. More preferably, the glass particles comprise greater than about 75% soda-lime glass.

In another preferred embodiment, the amount of cement normally added to a concrete composition containing no added glass is reduced from about 5% to about 15%. More preferably, the amount of cement normally added is reduced about 10%. Most preferably, the volume of the composition is adjusted for the addition of glass particles by the removal or exclusion of a proportionate volume of fine aggregate, such that over-yield of the mix is avoided.

In a preferred embodiment, the glass particles are present from about 15% to about 25%, by weight, of a conventional amount of cement used in concrete which contains no added glass particles. Most preferably, the glass particles are present at about 20%, by weight, of a conventional amount of cement used in a concrete compositions which contains no added glass particles.

Glass particles may also be added without a proportional reduction in the amount cement to achieve improved characteristics in the final cement or concrete composition. In a preferred embodiment, the glass particles are added in an amount from about 5% to about 20%, by weight, of a conventional amount of cement used in concrete which contains no added glass particles, wherein the conventional amount of cement is maintained. Most preferably, the glass particles are added in an amount of about 15%, by weight, of a conventional amount of cement used in concrete which contains no added glass particles.

The amount of glass particles present in the composition may be determined according to a desired strength of a finished concrete product produced from the composition.

In a preferred embodiment, the glass particles are present at about 50 lbs to about 70 lbs for each cubic yard of the concrete composition. Most preferably, the composition yields a finished concrete product having a compression strength of about 2500 psi.

In another preferred embodiment, the glass particles are present at about 80 lbs to about 100 lbs for each cubic yard of the concrete composition. Most preferably, the composition yields a finished concrete product having a compression strength of about 3000 psi.

In another preferred embodiment, the glass particles are present at about 100 lbs to about 120 lbs for each cubic yard of the concrete composition. Most preferably, the composition yields a finished concrete product having a compression strength of about 4000 psi.

In another preferred embodiment, the open time after pouring is increased. Most preferably, the composition is thixotropic during the open time.

In another preferred embodiment, mid-level alkali cement is used and the amount of glass particles in the composition is about 110% of the amount used with low alkali cement.

In another preferred embodiment, high alkali cement is used and the amount of glass particles in the composition is about 120% of the amount used with low alkali cement.

In another preferred embodiment, the concrete composition further comprises blast furnace slag. More preferably, the blast furnace slag comprises from about 30% to about 40%, by weight, and the glass particles from about 10% to about 20%, by weight, of a conventional amount of cement used in concrete which contains no added glass particles or blast furnace slag, the conventional amount of cement being reduced from about 40% to about 60% by weight. Even more preferably, the blast furnace slag comprises about 34%, by weight, and the glass particles about 16%, by weight, of a conventional amount of cement used in concrete which contains no added glass particles or blast furnace slag, the conventional amount of cement being reduced about 50% by weight. Most preferably, the blast furnace slag comprises about 40%, by weight, and the glass particles about 20%, by weight, of a conventional amount of cement used in concrete which contains no added glass particles or blast furnace slag, the conventional amount of cement being reduced from about 60% by weight.

In another preferred embodiment, the concrete composition further comprises fly ash. More preferably, the fly ash, glass particles, and cement together comprise a total weight equal to about 110%, by weight, of a conventional amount of cement used in concrete containing no added fly ash or glass particles, and the fly ash comprises from about 15% to about 25%, by weight, and the glass particles from about 15% to about 25%, by weight, of a conventional amount of cement used in a concrete composition containing no added fly ash or glass particles, the conventional amount of cement being reduced from about 20% to about 40%, by weight. Most preferably, the fly ash, glass particles, and cement together comprise a total weight equal to about 110%, by weight, of a conventional amount of cement used in concrete containing no added fly ash or glass particles, and the fly ash comprises about 20%, by weight, and the glass particles about 20%, by weight, of a conventional amount of cement used in a concrete composition containing no added fly ash or glass particles, the conventional amount of cement being reduced about 30% by weight.

The size distribution of the glass particles of the invention fills the gap in the size range between that of sand and that of cement. The glass particles of the invention may be derived from clean glass, including recycled container glass, plate glass, and/or mirror glass. Without intending to be bound by any particular theory, it appears that the negative charge of the glass particles increases the adherence of the sand, cement, and glass mixture to the stone aggregate, such that the mixture does not tend to segregate. It appears that this aspect leads to a mix which has the ability to resist being washed away when subjected to excess water. The addition of glass particles according to the present invention also imparts a lubricating effect which allows the mix to be pumped and moved more easily, and/or to exhibit a thixotropic character.

In another aspect, the invention relates to a composition comprising glass particles, lithium-containing glass, and cement. In a preferred embodiment, the cement composition comprises from about 10% to about 20% glass particles, by weight, from about 2% to about 6% lithium-containing glass, by weight, and from about 76% to about 84%, by weight, cement. More preferably, the cement composition comprises from about 14% to about 18% glass particles, by weight, from about 2% to about 6% lithium-containing glass, by weight, and from about 76% to about 84%, by weight, cement. Most preferably, the cement compositions comprises about 16% glass particles, by weight, about 4% lithium-containing glass, by weight, and about 80% cement, by weight. The foregoing compositions are combined in substantially equal parts, by weight, of suitable aggregate to form the final compositions to be combined with an appropriate amount of water to form the final concrete compositions.

In another preferred embodiment, the open time after pouring is increased. Most preferably, the composition is thixotropic during the open time.

Those of ordinary skill in the art will recognize that, in addition to the lithium-containing glass component, appropriate amounts of other substances known to mitigate ASR may be determined, and added in order to accomplish ASR suppression. Also, the amount of glass particles present in the composition may be determined according to a desired strength of a finished concrete product produced from the composition.

In yet another aspect, the invention relates to a composition comprising E-glass particles, cement, and aggregate, wherein the size of the E-glass particles comprises a maximum particle size of from about 275 to about 375 mesh. More preferably, the maximum particle size is from about 300 to about 350 mesh. Most preferably, the maximum particle size is about 325 mesh. Also, most preferably, the aggregate comprises small pebbles.

In a preferred embodiment, the E-glass particles are substituted for a portion of the cement in an amount ranging from about 10% to about 30% by weight of the amount of cement in a standard composition not containing glass particles. More preferably, the E-glass particles are substituted for a portion of the cement in an amount ranging from about 15% to about 25% by weight of the amount of cement in a standard composition. Most preferably, E-glass particles are substituted for portion of the cement in an amount of about 20% by weight of the amount of cement in a standard composition.

E-glass particles may also be added without a proportional reduction in the amount cement to achieve improved characteristics in the final cement or concrete composition. Accordingly, in another preferred embodiment, the E-glass particles are added in an amount ranging from about 5% to about 30% by weight of the amount of cement in a standard composition not containing glass particles, wherein the conventional amount of cement is maintained. More preferably, the E-glass particles are added in an amount ranging from about 10% to about 25% by weight of the amount of cement in a standard composition. Most preferably, E-glass particles are added in an amount from about 15% to about 20% by weight of the amount of cement in a standard composition.

In another aspect, the invention relates to a process for preparing cement or concrete compositions wherein an E-glass component is added during a general processing operation in an unprocessed form along one or more other unprocessed cementeous components.

In a preferred embodiment, the E-glass component is added to an unprocessed cementeous component prior to a general processing operation. More preferably, the unprocessed E-glass component comprises E-glass cullet. Also more preferably, the E-glass cullet comprises a by-product of a process for producing fiber glass. Also more preferably, the unprocessed cementeous component is cement clinker. Also more preferably, the general processing operation comprises a final grinding process. Also more preferably, the unprocessed E-glass component is substituted for a portion of the cement clinker in an amount ranging from about 10% to about 30% by weight of the amount of cement in a standard composition not containing glass particles. Also more preferably, the E-glass component is substituted for a portion of the cement clinker in an amount ranging from about 15% to about 25% by weight of the amount of cement in a standard composition. Most preferably, E-glass component is substituted for portion of the cement clinker in an amount of about 20% by weight of the amount of cement in a standard composition. If an additional pozzolanic substance, such as metakaoline, is added, the amount of the E-glass component may be reduced to about 5% to about 10%, while still providing the beneficial characteristics of the invention.

The inclusion of the unprocessed E-glass component along with the unprocessed cementeous component leads to greater efficient in producing the E-glass-containing compositions of the invention. During processing of the mixed components, the E-glass component acts as a grinding aid, and increases the though-put capacity of the process, particularly when using a ball-mill grinding process although other processes may also be used with similar increased efficiency.

The compositions of the invention containing E-glass are particularly useful for use as pool plasters in the construction of swimming pools and similar outdoor recreational areas. The E-glass component functions as a rheology modifier in that it increases flow, controls creep, and increases workability while simultaneously controlling bleed water and shrinkage. The E-glass added in the compositions of the invention does not contribute to ASR. In the compositions of the invention, the E-glass is pozzolanic and produces a cement which will outperform cements containing fly ash in reducing expansion of concrete compositions produced therefrom.

Pool plaster compositions typically contain pozzolanic substances such as metakaoline and/or silica fume. The use of ground E-glass in compositions of the present invention allows the reduction or elimination of this expensive component of current compositions. Accordingly, in a preferred embodiment of the invention, a pool plaster composition is provided which contains a reduced amount of pozzolan. Most preferably, pozzolanic substances are not present, other than E-glass itself.

An example of the component composition of E-glass is shown in Table 1 below.

TABLE 1

| Component | DL(%)* | Results (%) |
| --- | --- | --- |
| Aluminum oxide | 0.738 | 13.536 |
| Boron oxide (B$_2$O$_3$) | 0.031 | 4.451 |
| Calcium oxide | 0.131 | 20.416 |
| Chromium oxide | 0.002 | 0.014 |
| Iron (III) oxide | 0.067 | 0.220 |
| Magnesium oxide | 0.008 | 0.353 |
| Potassium oxide | 0.020 | 0.086 |
| Silicon dioxide | 16.711 | 49.597 |
| Sodium oxide | 0.316 | 1.372 |
| Strontium oxide | 0.012 | 0.065 |

TABLE 1-continued

| Component | DL(%)* | Results (%) |
| --- | --- | --- |
| Sulfur trioxide | 0.058 | 0.119 |
| Titanium oxide | 0.007 | 0.403 |

*DL = detection limit

It will be understood that the present invention also relates to methods of producing the concrete compositions according to the foregoing description. The dry components may be premixed according to the proportions indicated for particular embodiments. For example, glass components and cement (or glass, slag or fly ash, and cement) may be pre-mixed in dry form for later combination with aggregate and water to produce the concrete compositions of the invention. The described compositions may also be introduced into a manufacturing process in a manner well known in the concrete art, in order to produce the concrete compositions of the invention.

EXAMPLES

Example 1 Recycled Glass

In Examples 1–4 below, "glass particles" refers to particles of recycled glass which fall in a graded, average size distribution characterized as follows:

approx. 12%=100 mesh
approx. 47%=200 mesh
approx. 19%=325 mesh
approx. 22%=smaller than 325 mesh.

A concrete composition containing recycled glass was produced by mixing the components as described in Table 2.

TABLE 2

| Component | Amount (to yield a cubic yard) | Comments |
| --- | --- | --- |
| Cement | 513 lbs (90% of stnd 570 lbs) | Low-alkali cement. |
| Glass | 114 lbs | 20% of stnd lbs cement by weight. |
| Aggregate | To yield 1 cubic yard | Non-reactive aggregate. |

In the composition described in Table 2, the glass component is present as 20%, by weight, of the standard amount of cement for a composition containing no added glass (defined as 570 lbs/cubic yard of concrete composition). Final yield was adjusted to 1 cubic yard by removing an appropriate volume of fine aggregate.

The above-described composition yields a product exhibiting a compression strength equal to a cement-only composition (no added glass) using the standard amount of cement. As noted in the description above, the amount of glass added may be modified to produce a final composition exhibiting various compression strengths. A composition containing 60 lbs added glass/cubic yard was observed to produce a final composition exhibiting a compression strength of 2500 psi. Further, a composition containing 90 lbs added glass/cubic yard was observed to produce a final composition exhibiting a compression strength of 3000 psi. Finally, a composition containing 110 lbs added glass/cubic yard was observed to produce a final composition exhibiting a compression strength of 4000 psi. In each composition, the final yield (cubic yard) was achieved by reducing the amount of fine aggregate added, in order to compensate for the volume of added glass particles.

The foregoing compositions provide superior workability of the concrete composition and have been observed not to contribute to ASR when non-reactive aggregate is used.

Example 2 Recycled Glass and Blast Furnace Slag

A concrete composition containing recycled glass, and blast furnace slag as an additional pozzolan, was produced by mixing the components as described in Table 3 and Table 4:

TABLE 3

| Component | Amount (to yield a cubic yard) | Comments |
| --- | --- | --- |
| Cement | 285 lbs (50% of stnd 570 lbs) | Low-alkali cement. |
| Blast Furnace Slag | 194 lbs | with glass, equal to 50% of stnd lbs cement by weight. |
| Glass | 91 lbs | 20% of stnd lbs cement by weight. |
| Aggregate | To yeild 1 cubic yard | Non-reactive aggregate. |

TABLE 4

| Component | Amount (to yeild a cubic yard) | Comments |
| --- | --- | --- |
| Cement | 228 lbs (40% of stnd 570 lbs) | Low-alkali cement. |
| Blast Furnace Slag | 233 lbs | With glass, equal to 50% of stnd lbs cement by weight. |
| Glass | 109 lbs | 20% of stnd lbs cement by weight. |
| Aggregate | To yield 1 cubic yard | Non-reactive aggregate. |

In the compositions described in Tables 3 and 4, the slag and glass components are present relative to each other as 32% glass and 68% slag. This ratio is constant whether a mix is produced with a 50% (Table 3) or a 60% (Table 4) reduction in the standard amount of cement (defined as 570 lbs cement/cubic yard of concrete composition). In each case, the above-described compositions yield a product exhibiting a compression strength equal to the cement-only composition (no added slag, no added glass) using the standard amount of cement.

Example 3 Recycled Glass, Blast Furnace Slag, and Fly Ash

A concrete composition containing recycled glass, and blast furnace slag and fly ash as additional pozzolans, was produced by mixing the components as described in Table 5:

TABLE 5

| Component | Amount (to yeild a cubic yard) | Comments |
| --- | --- | --- |
| Cement | 399 lbs (70% of stnd 570 lbs) | Low-alkali cement. |
| Fly Ash | 114 lbs | 20% of 570 lbs cement by weight. |
| Glass | 114 lbs | 20% of 570 lbs cement by weight. |
| Aggregate | To yield 1 cubic yard | Non-reactive aggregate. |

As shown in Table 5, the total amount of cement, fly ash, and glass in the composition of Example 3 equals 110% by weight of the standard 570 lbs cement/cubic yard of the concrete composition (627 lbs/cubic yard). As in Examples 1 and 2, the composition described in Table 5 yields a product exhibiting a compression strength equal to the cement-only composition (no fly ash, no glass) using the standard amount of cement.

Example 4 Recycled Glass and Lithium-Containing Glass

A cement composition containing recycled glass was produced by mixing the components as described in Table 6.

TABLE 6

| Componet | Amount | Comments |
| --- | --- | --- |
| Cement | 1600 lbs | 80% of 2000 lbs cement/glass mix |
| Glass particles | 320 lbs | 16% of 2000 lbs cement/glass mix |
| Lithium-containing glass | 80 lbs | 4% of 2000 lbs cement/glass mix |
| Aggregate | To yield 4000 lbs | |

The inventors have shown that the composition described in Table 6 provides a mix which is especially suitable for pouring surfaces for outdoor recreational areas such as those adjacent to swimming pools. The addition of the glass particles provides the superior workability qualities as described above. The potential problem of ASR is suppressed or avoided by the inclusion of the lithium-containing glass component.

The cement, glass particles, lithium-containing glass, and aggregate, or a subcombination thereof, may be packaged as a dry mix to be combined with appropriate amounts of water to form the desired concrete composition.

Example 5 E-glass

E-glass particles are produced by grinding E-glass to a size of 325 mesh or smaller. These E-glass particles replace 20% of the cementeous component of a typical pool plaster composition containing the following proportional components:

50% stone, as small pebbles or ground marble aggregate; and

50% cementeous material*

*Typically 15% of the cementeous component would be metakaoline and/or silica fume as pozzolanic additives.

Although, E-glass-containing pool plaster compositions may also contain additional pozzolans such as metakaoline or silica fume, one feature of the present invention is that the requirement for such additives is obviated by the addition of E-glass particles.

Any or all of the dry components may be packaged as a dry mix to be combined with appropriate amounts of water to form the desired concrete composition.

Example 6 Process for Producing glass-containing Cement Compositions

E-glass cullet, e.g. as a by-product produced during fiber glass manufacturing, is substituted for cement clinker in an amount of 10% to 15% by weight of the cement clinker prior to a final ball-mill grinding process. The components are then ground together to produce a final mixture having a particle size below 325 mesh. The E-glass cutlet acts as a grinding aid and increases the through-put of the grinding process. The process also increases the efficiency of producing the E-glass-containing compositions of the invention by obviating the need for a separate processing step to produce E-glass particles of the desired size from unprocessed E-glass cullet, prior to addition to other cementeous components.

With respect to the descriptions set forth above, optimum aspects and features of the invention are deemed readily apparent and obvious to those skilled in the art, and all equivalent relationships to those illustrated in the drawings and described in the specification are intended to be encompassed herein. The foregoing is considered as illustrative only of the principal of the invention. Since numerous modifications and changes will readily occur to those skilled in the art, it is not intended to limit the invention to the exact compositions and methods as shown and described, and all suitable modifications and equivalents falling within the scope of the appended claims are deemed within the present inventive concept.

What is claimed is:

1. A concrete composition comprising glass particles, low-alkali cement, and aggregate, wherein the size of said glass particles is characterized by a maximum size of from about 80 to about 120 mesh, and from about 40% to about 60% of said glass particles are from about 180 to about 220 mesh, and from about 10% to about 30% of said glass particles are less than 325 mesh.

2. The concrete composition of claim 1, wherein said maximum size of said glass particles is about 90 to about 110 mesh.

3. The concrete composition of claim 1, wherein about 70% to about 90% said glass particles are larger than about 325 mesh.

4. The concrete composition of claim 1, wherein said glass particles are particles of recycled glass.

5. The concrete composition of claim 1, where said glass particles comprise greater than about 75% soda-lime glass.

6. The concrete composition of claim 1, wherein said glass particles are present from about 15% to about 25%, by weight, of a conventional amount of cement used in concrete which contains no added glass particles.

7. The concrete composition of claim 1, wherein said glass particles are present at about 20%, by weight, of a conventional amount of cement used in a concrete compositions which contains no added glass particles.

8. The concrete composition of claim 1, wherein an amount of said glass particles present is determined according to a desired strength of a finished concrete product produced from said composition.

9. The concrete composition of claim 8, wherein said glass particles are present at about 50 lbs to about 70 lbs for each cubic yard of said concrete composition, yielding a finished concrete product having a compression strength of about 2500 psi.

10. The concrete composition of claim 8, wherein said glass particles are present at about 80 lbs to about 100 lbs for each cubic yard of said concrete composition, yielding a finished concrete product having a compression strength of about 3000 psi.

11. The concrete composition of claim 8, wherein said glass particles are present at about 100 lbs to about 120 lbs for each cubic yard of said concrete composition, yielding a finished concrete product having a compression strength of about 4000 psi.

12. The concrete composition of claim 1, wherein the amount of cement normally added to a concrete composition containing no added glass is reduced from about 5% to about 15%.

13. The concrete composition of claim 1, wherein the open time after pouring is increased relative to a concrete composition containing no added glass.

14. The concrete composition of claim 13, wherein said composition is thixotropic during said open time.

15. The concrete composition of claim 1, wherein mid-level alkali cement is used and the amount of said glass particles in said composition is about 110% that used with low alkali cement.

16. The concrete composition of claim 1, wherein high alkali cement is used and the amount of said glass particles in said composition is about 120% that used with low alkali cement.

17. The concrete composition of claim 1, wherein the volume of said, composition is adjusted for the addition of glass particles by removal or exclusion of a proportionate volume of fine aggregate such that over-yield of the final composition is avoided.

18. The concrete composition of claim 1, wherein substantially none of said glass particles are larger than 100 mesh.

19. The concrete composition according to claim 1, further comprising blast furnace slag.

20. The concrete composition according to claim 19, wherein said blast furnace slag comprises from about 30% to about 40%, by weight, and said glass particles from about 10% to about 20%, by weight, of a conventional amount of cement used in concrete which contains no added glass particles or blast furnace slag, said conventional amount of cement being reduced from about 40% to about 60% by weight.

21. The concrete composition according to claim 19, wherein said blast furnace slag comprises about 34%, by weight, and said glass particles about 16%, by weight, of a conventional amount of cement used in concrete which contains no added glass particles or blast furnace slag, said conventional amount of cement being reduced about 50% by weight.

22. The concrete composition according to claim 19, wherein said blast furnace slag comprises about 40%, by weight, and said glass particles about 20%, by weight, of a conventional amount of cement used in concrete which contains no added glass particles or blast furnace slag, said conventional amount of cement being reduced from about 60% by weight.

23. The concrete composition according to claim 1, further comprising fly ash.

24. The concrete composition according to claim 23, wherein said fly ash, said glass particles, and said cement together comprise a total weight equal to about 110%, by weight, of a conventional amount of cement used in concrete containing no added fly ash or glass particles, and wherein said fly ash comprises from about 15% to about 25%, and said glass particles from about 15% to about 25%, by weight, of a conventional amount of cement used in a concrete composition containing no added fly ash or glass particles, said conventional amount of cement being reduced about 20% to about 40% by weight.

25. The concrete composition according to claim 23, wherein said fly ash, said glass particles, and said cement together comprise a total weight equal to about 110%, by weight, of a conventional amount of cement used in concrete containing no added fly ash or glass particles, and wherein said fly ash comprises about 20%, and said glass particles about 20%, by weight, of a conventional amount of cement used in a concrete composition containing no added fly ash or glass particles, said conventional amount of cement being reduced about 30% by weight.

26. The concrete composition of claim 1, wherein the amount of cement in said composition is reduced from a conventional amount of cement for a concrete composition containing no added glass particles by an amount equal by weight to the amount of glass particles in the composition.

27. The concrete composition of claim 1, wherein the amount of glass particles in the composition is added in addition to a conventional amount of cement for a concrete composition containing no added glass particles.

28. The concrete composition of claim 27, wherein the glass particles are added in an amount from about 5% to about 20%, by weight, of a conventional amount of cement used in concrete which contains no added glass particles.

29. The concrete composition of claim 27, wherein the glass particles are added in an amount of about 15%, by weight, of a conventional amount of cement used in concrete which contains no added glass particles.

30. A concrete composition comprising glass particles, lithium-containing glass, and cement, wherein the size of said glass particles is characterized by a maximum size of from about 80 to about 120 mesh, and from about 40% to about 60% of said glass particles are from about 180 to about 220 mesh, and from about 10% to about 30% of said glass particles are less than 325 mesh.

31. The concrete composition of claim 30, wherein the composition comprises from about 10% to about 20% glass particles, by weight, from about 2% to about 6% lithium-containing glass, by weight, and from about 76% to about 84%, by weight, cement.

32. The concrete composition of claim 30, wherein the composition comprises from about 14% to about 18% glass particles, by weight, from about 2% to about 6% lithium-containing glass, by weight, and from about 76% to about 84%, by weight, cement.

33. The concrete composition of claim 30, wherein the composition comprises about 16% glass particles, by weight, about 4% lithium-containing glass, by weight, and about 80% cement, by weight.

34. A concrete composition comprising E-glass particles, cement, and aggregate, wherein the maximum size of the E-glass particles is from about 275 to about 375 mesh.

35. The concrete composition of claim 34, wherein said maximum size is from about 300 to about 350 mesh.

36. The concrete composition of claim 34, wherein said maximum size is about 325 mesh.

37. The concrete composition of claim 34, wherein said aggregate comprises small pebbles.

38. The concrete composition of claim 34, wherein said E-glass particles are substituted for a portion of said cement in an amount ranging from about 10% to about 30% by weight of an amount of cement in a standard composition not containing glass particles.

39. The concrete composition of claim 38, said E-glass particles are substituted for a portion of said cement in an amount ranging from about 15% to about 25% by weight of said amount of cement in a standard composition.

40. The concrete composition of claim 38, the E-glass particles are substituted for portion of said cement in an amount of about 20% by weight of said amount of cement in a standard composition.

41. The concrete composition of claim 38, wherein said composition further comprises an additional pozzolanic substance and said E-glass particles are substituted for a portion of said cement in an amount ranging from about 5% to about 10% by weight of said amount of cement in a standard composition.

42. The concrete composition of claim 34, wherein the amount of cement in said composition is reduced from a conventional amount of cement for a concrete composition containing no added E-glass particles by an amount equal by weight to the amount of E-glass particles in the composition.

43. The concrete composition of claim 34, wherein the amount of E-glass particles in the composition is added in addition to a conventional amount of cement for a concrete composition containing no added E-glass particles.

44. The concrete composition of claim 43, wherein the E-glass particles are added in an amount from about 5% to about 30%, by weight, of a conventional amount of cement used in concrete which contains no added E-glass particles.

45. The concrete composition of claim 43, wherein the E-glass particles are added in an amount of from about 10% to about 25%, by weight, of a conventional amount of cement used in concrete which contains no added E-glass particles.

46. The concrete composition of claim 43, wherein the E-glass particles are added in an amount of from about 15% to about 20%, by weight, of a conventional amount of cement used in concrete which contains no added E-glass particles.

47. A process for preparing the concrete composition of claim 34, wherein an E-glass component is added during a general processing operation in an unprocessed form along with at least one additional unprocessed cementeous components.

48. The process of claim 47, wherein said E-glass component is added to said at least one additional unprocessed cementeous component prior to a general processing operation.

49. The process of claim 48, wherein said general processing operation comprises a final grinding process.

50. The process of claim 47, wherein said E-glass component comprises E-glass cullet.

51. The process of claim 50, wherein said E-glass cullet comprises a by-product of a process for producing fiberglass.

52. The process of claim 47, wherein said at least one additional unprocessed cementeous component is cement clinker.

53. The process of claim 52, wherein said E-glass component is substituted for a portion of the cement clinker in an amount ranging from about 10% to about 30% by weight of an amount of cement in a standard composition not containing glass particles.

54. The process of claim 52, wherein said E-glass component is substituted for a portion of said cement clinker in an amount ranging from about 15% to about 25% by weight of said, amount of cement in a standard composition.

55. The process of claim 52, wherein said E-glass component is substituted for a portion of said cement clinker in an amount of about 20% by weight of said amount of cement in a standard composition.

* * * * *